(12) United States Patent
Verma et al.

(10) Patent No.: US 12,189,466 B2
(45) Date of Patent: Jan. 7, 2025

(54) DETECTING SYSTEMWIDE SERVICE ISSUES BY USING ANOMALY LOCALIZATION

(71) Applicant: Microsoft Technology Licensing, LLC, Redmond, WA (US)

(72) Inventors: Mohit Verma, Seattle, WA (US); Julien Hoachuck, San Francisco, CA (US); Qingwei Lin, Beijing (CN); Pooja Rani, Woodinville, WA (US); Namrata Jain, Sammamish, WA (US); Rakesh Namineni, Sammamish, WA (US); Jimmy Wong, Bellevue, WA (US); Si Qin, Beijing (CN); Yu Kang, Beijing (CN); Jeffrey Ding He, Bellevue, WA (US); Yingnong Dang, Sammamish, WA (US); Jian Zhang, Bellevue, WA (US); Bo Qiao, Beijing (CN); Kamaljit Bath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/050,866

(22) Filed: Oct. 28, 2022

(65) Prior Publication Data
US 2024/0143433 A1 May 2, 2024

(51) Int. Cl.
*G06F 11/07* (2006.01)
(52) U.S. Cl.
CPC ........ *G06F 11/079* (2013.01); *G06F 11/0709* (2013.01); *G06F 11/0769* (2013.01)

(58) Field of Classification Search
CPC . G06F 11/079; G06F 11/0709; G06F 11/0769
See application file for complete search history.

(56) References Cited

U.S. PATENT DOCUMENTS

| 8,375,255 B2 | 2/2013 | Wang et al. |
| 10,983,850 B1 * | 4/2021 | Kwan ................ G06F 11/0793 |
| (Continued) | | |

OTHER PUBLICATIONS

"Anomaly Detector", Retrieved From: https://azure.microsoft.com/en-us/services/cognitive-services/anomaly-detector/#overview, Retrieved on: Aug. 18, 2022, 13 Pages.

(Continued)

*Primary Examiner* — Jigar P Patel

(57) ABSTRACT

Methods and systems for detecting systemwide service issues by using anomaly localization. In an example, a method includes receiving time-series monitoring data for multiple services, the time-series monitoring data including multiple dimensions and an error metric; for the monitoring data from each service, evaluating scopes within the monitoring data based on an objective function for a time-series of the error metric to identify at least one anomalous scope, each scope including at least one dimension and a value for the dimension; based on evaluating the scopes, generating a ranked list of scopes for each service based on objective function scores for the scopes; correlating the ranked lists of scopes across the multiple services to identify a cross-service anomaly; and generating an alert for the services based on the cross-service anomaly, the alert indicating at least one scope as a potential root cause for the cross-service anomaly.

20 Claims, 19 Drawing Sheets

(56) References Cited

U.S. PATENT DOCUMENTS

| | | | |
|---|---|---|---|
| 11,392,446 | B2 | 7/2022 | Poole et al. |
| 2017/0054610 | A1* | 2/2017 | Vangala ................. G06F 11/079 |
| 2017/0353477 | A1* | 12/2017 | Faigon .................. G06F 21/554 |
| 2018/0032386 | A1 | 2/2018 | Dechiaro |
| 2021/0027205 | A1* | 1/2021 | Sevakula ............ G06F 11/3447 |
| 2021/0398137 | A1* | 12/2021 | Liu ........................ G06N 20/00 |
| 2022/0014422 | A1 | 1/2022 | Gupta Hyde et al. |
| 2022/0382856 | A1* | 12/2022 | Yang ....................... G06F 21/55 |

OTHER PUBLICATIONS

"Capgemini And Orange Announce Plan to Create "Bleu", A Company to Provide a "Cloud De Confiance" In France", Retrieved From: https://www.capgemini.com/news/press-releases/capgemini-and-orange-announce-plan-to-create-bleu-a-company-to-provide-a-cloud-de-confiance-in-france-2/, May 27, 2021, 6 Pages.

"Kick Start for the First Sovereign Cloud Platform for the Public Sector in Germany: SAP and Arvato Systems Announce Partnership", Retrieved From: https://news.sap.com/2022/02/sap-arvato-systems-partnership/, Feb. 3, 2022, 5 Pages.

Basseville, et al., "Detection of Abrupt Changes: Theory and Application", In Publication of Englewood Cliffs: Prentice Hall, Apr. 1993, 528 Pages.

Gu, et al., "Efficient Incident Identification from Multi-dimensional Issue Reports via Meta-heuristic Search", In Proceedings of the 28th ACM Joint Meeting on European Software Engineering Conference and Symposium on the Foundations of Software Engineering, Nov. 8, 2020, pp. 292-303.

Singh, Ajay, "Using ML and Logs to Catch Problems in a Distributed Kubernetes Deployment", Retrieved From: https://www.zebrium.com/blog/using-ml-and-logs-to-catch-problems-in-a-distributed-kubernetes-deployment-org, Retrieved on: Aug. 18, 2022, 6 Pages.

Stradley, Scott, "The Definitive Guide to Event Correlation in AIOps: Processes, Tools, Examples, and Checklist", Retrieved From: https://www.bigpanda.io/blog/event-correlation/, Aug. 20, 2020, 27 Pages.

* cited by examiner

| Time | Country | Datacenter | Interruption |
|---|---|---|---|
| 2019-04-01 | USA | DM1 | 1 |
| 2019-04-01 | Australia | MEL21 | 1 |
| 2019-04-01 | USA | DC1 | 4 |
| 2019-04-01 | India | BL1 | 10 |
| 2019-04-01 | UK | SN6 | 3 |
| 2019-04-01 | USA | DM1 | 5 |
| ...... | ...... | ...... | ...... |

Table 3

Plot 2

Plot 3

| Time | Country | Datacenter | DiskType | Interruption |
|---|---|---|---|---|
| 2019-04-01 | USA | DM1 | SSD | 1 |
| 2019-04-01 | Australia | MEL21 | SSD | 1 |
| 2019-04-01 | USA | DC1 | SSD | 1 |
| 2019-04-01 | India | BL1 | SSD | 6 |
| 2019-04-01 | UK | SN6 | Hybrid | 1 |
| 2019-04-01 | USA | DM1 | HDD | 2 |
| ......... | ......... | ......... | ......... | ......... |

Table 4

FIG. 5A

| Dataset | AiDice | | | iDice | | | NSGA-2 | | | MOEA/D | | |
|---|---|---|---|---|---|---|---|---|---|---|---|---|
| | P | R | F | P | R | F | P | R | F | P | R | F |
| One-10 | 0.97 | 0.97 | 0.97 | 0.85 | 1.00 | 0.92 | 0.87 | 0.87 | 0.87 | 0.80 | 0.89 | 0.84 |
| One-20 | 0.92 | 0.88 | 0.90 | 0.26 | 0.35 | 0.30 | 0.85 | 0.82 | 0.83 | 0.38 | 0.76 | 0.50 |
| One-30 | 0.76 | 0.83 | 0.80 | 0.25 | 0.31 | 0.28 | 0.77 | 0.77 | 0.77 | 0.32 | 0.75 | 0.45 |
| One-40 | 0.71 | 0.75 | 0.73 | 0.23 | 0.30 | 0.26 | 0.66 | 0.73 | 0.70 | 0.23 | 0.71 | 0.34 |
| One-50 | 0.70 | 0.81 | 0.75 | 0.18 | 0.22 | 0.20 | 0.70 | 0.72 | 0.71 | 0.24 | 0.72 | 0.36 |
| Two-10 | 0.99 | 0.90 | 0.95 | 0.69 | 0.84 | 0.75 | 1.00 | 0.51 | 0.68 | 0.98 | 0.70 | 0.82 |
| Two-20 | 0.92 | 0.81 | 0.86 | 0.31 | 0.34 | 0.32 | 1.00 | 0.55 | 0.71 | 0.88 | 0.63 | 0.73 |
| Two-30 | 0.82 | 0.77 | 0.79 | 0.32 | 0.26 | 0.29 | 0.99 | 0.55 | 0.71 | 0.62 | 0.56 | 0.59 |
| Two-40 | 0.73 | 0.72 | 0.72 | 0.25 | 0.22 | 0.23 | 0.98 | 0.42 | 0.59 | 0.52 | 0.54 | 0.53 |
| Two-50 | 0.76 | 0.76 | 0.76 | 0.21 | 0.19 | 0.23 | 0.92 | 0.45 | 0.60 | 0.56 | 0.55 | 0.55 |

FIG. 8B

| Dataset | AiDice | iDice | Time(s) NSGA-2 | MOEA/D |
|---|---|---|---|---|
| One-10 | 7.13 | 5.62 | 10.45 | 11.35 |
| One-20 | 8.01 | 21.81 | 11.82 | 13.46 |
| One-30 | 8.68 | 41.01 | 13.31 | 14.82 |
| One-40 | 9.50 | 98.43 | 15.39 | 16.88 |
| One-50 | 9.86 | 177.99 | 17.20 | 18.60 |
| Two-10 | 7.4 | 10.77 | 10.99 | 12.99 |
| Two-20 | 9.13 | 29.15 | 13.02 | 15.44 |
| Two-30 | 10.03 | 57.69 | 15.23 | 17.24 |
| Two-40 | 10.69 | 136.41 | 18.09 | 19.05 |
| Two-50 | 11.48 | 204.37 | 20.76 | 20.65 |

FIG. 8C

| Dataset | AiDice | iDice | #Incidents NSGA-2 | MOEA/D | RS |
|---|---|---|---|---|---|
| A1 | 13 | 8 | 4 | 6 | 4 |
| A2 | 18 | 12 | 3 | 4 | 2 |
| A3 | 13 | - | 2 | 3 | 3 |
| A4 | 16 | 9 | 7 | 13 | 4 |
| A5 | 17 | - | 1 | 3 | 4 |
| A6 | 22 | 20 | 4 | 8 | 2 |
| B1 | 10 | 9 | 5 | 6 | 4 |
| B2 | 5 | 6 | 3 | 3 | 4 |
| B3 | 9 | - | 4 | 10 | 3 |
| B4 | 15 | 10 | 4 | 5 | 1 |
| B5 | 7 | 8 | 3 | 4 | 1 |
| B6 | 5 | 5 | 4 | 3 | 0 |

FIG. 8D

DETECTING SYSTEMWIDE SERVICE ISSUES BY USING ANOMALY LOCALIZATION

BACKGROUND

Modern computing systems, particularly those that rely on cloud computing functionalities, rely on a number of remote services, such as email services, messaging services, and document storage services among others. These remote services have common underlying dependencies, such as authentication, networking, storage, etc. When something goes wrong in one of these underlying dependencies, typically multiple remote services will be impacted.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The presently disclosed technology provides for systems and methods that detect systemwide service issues through anomaly localization. The technology alleviates, among other things, the problems of disjointed root-cause identification by ingesting monitoring probe data from different services. Multiple anomaly localizers analyze the ingested monitoring probe data to identify error spikes along with the dimensions associated with that spike (e.g., http status code, topology information such as region or forest, etc.). The error spikes are then correlated on the dimensions of the ingested data. For instance, the more dimensions that are in common across the error spikes, the higher likelihood of the issues being related and a higher likelihood of a systemwide issue happening. Alerts may then be generated to the services to indicate the cross-service anomaly or anomalies.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 5A depicts a table of time series data with an additional dimension.

FIGS. 8B-8D depict tables showing example data for the hybrid search mode.

DETAILED DESCRIPTION

Figure 1:
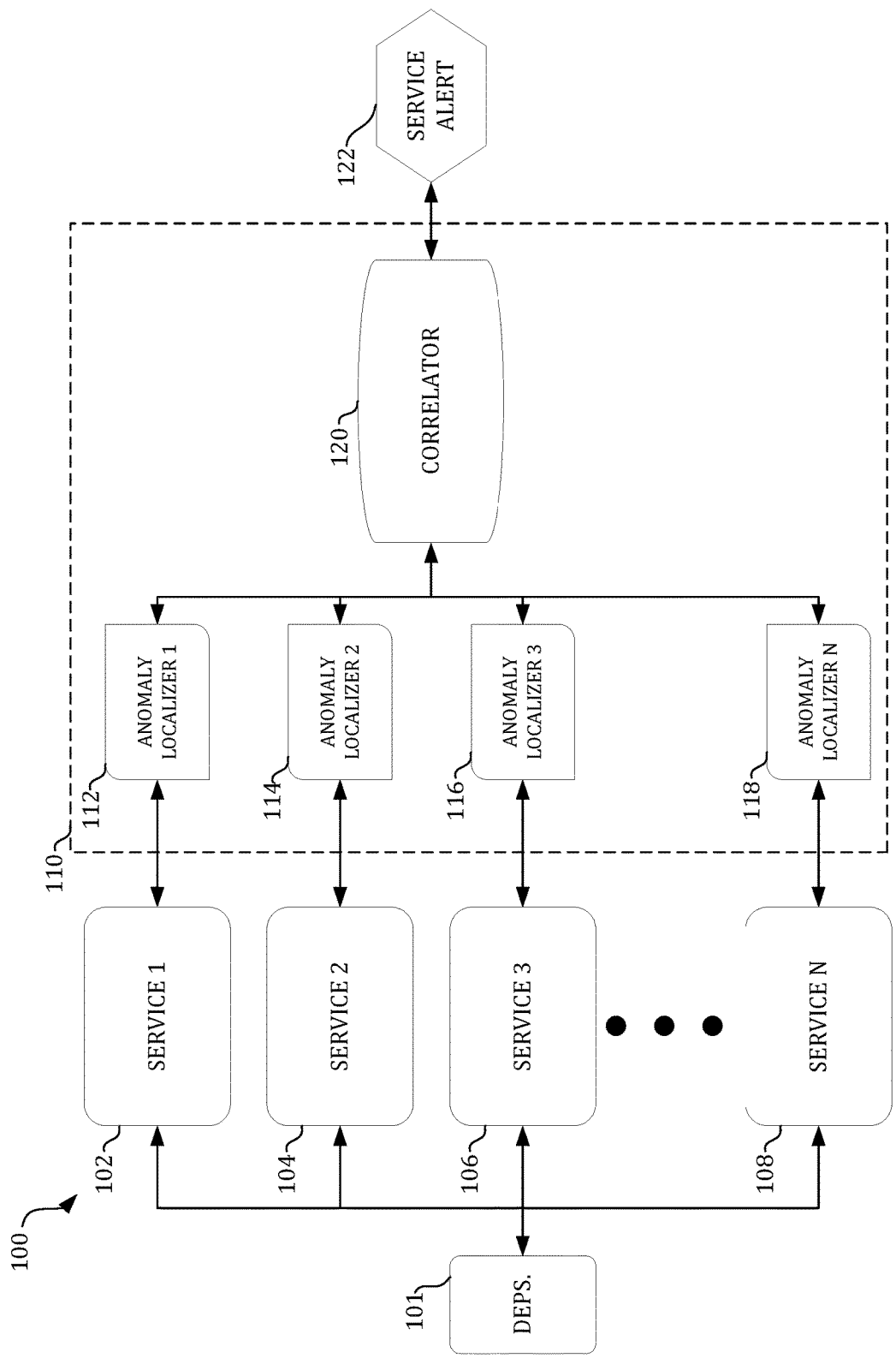
FIG. 1 depicts an example system for detecting systemwide services issues by using anomaly localization.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As briefly discussed above, remote services (such as email services, messaging services, and document storage services) have common underlying dependencies, such as authentication, networking, storage, etc. When something goes wrong in one of these underlying dependencies, typically multiple remote services may be impacted and lead to downtime. Detecting these problems, however, tends to be disjointed. As a result, each remote service may discover these impacts independently and determine root causes of those issues to the common problem. This process leads to large amounts of computing and human resources in individually identifying the root causes. Where the services are more limited or isolated, such as in an air-gapped or isolated cloud environment, negative impacts or downtimes may last even longer due to less resources available for identifying root causes.

The presently disclosed technology alleviates, among other things, the problems of disjointed root-cause identification by ingesting monitoring probe data from different services. Multiple anomaly localizers analyze the ingested monitoring probe data to pre-emptively identify error spikes along with the dimensions associated with that spike (e.g., http status code, topology information such as region or forest, etc.). The error spikes are then correlated on the dimensions of the ingested data. For instance, the more dimensions that are in common across the error spikes, the higher likelihood of the issues being related and a higher likelihood of a systemwide issue happening.

In this approach, the human judgement aspect of root cause identification may also be removed or minimized because the monitoring probe data is ingested in a raw form and the anomaly localizers identify error spikes. Once the error spikes are identified, such spikes are correlated on their dimensions without requiring human judgement as well. Shapes of the error spikes and/or time delays between the error spikes of different services may also be compared to identify additional correlations. These analyses reduce the time to detect and correlate the issues. Further, because the system has lower reliance on human judgement, as more services relying on the same dependencies are added to the cloud, the signals from those services may be easily ingested and analyzed by the system, resulting in a highly scalable solution.

FIG. 1 depicts an example system 100 for detecting systemwide services issues by using anomaly localization. The system includes multiple services 102-108 that rely one or more shared or common dependencies. For example, the services include a first service 102, a second service 104, a third service 106, and an nth service 108. The services 102-108 may include remote or cloud-based services such as email services, messaging services, and/or document storage services, among others. The dependencies may include features such as authentication, networking, storage, etc. For instance, the services 102-108 may all rely on a common domain name system (DNS) system or server(s). Because each of the services 102-108 rely on the same dependencies 101, an issue with the dependencies 101 may impact each of the services 102-108.

The system 100 further includes a systemwide alert generation (SWAG) subsystem 110. The SWAG system includes a plurality of anomaly localizers 112-118. For instance, an anomaly localizer may be instantiated or initialized for each service of interest. Accordingly, for N number of services, N number of anomaly localizers may be implemented in the SWAG subsystem. The number of anomaly localizers may scale linearly with the number of services analyzed. For example, the anomaly localizers 112-118 include a first anomaly localizer 112, a second anomaly localizer 114, a third anomaly localizer 116, and an nth anomaly localizer 118. Each anomaly localizer may be its own program, module, or set of code for carrying out the search and evaluation functions on the ingested data that are discussed herein. In other examples, the number of anomaly analyzers may be based on a number of scopes (e.g., combinations of dimensions in the monitoring data) that are of interest. Such examples, however, result in the number of anomaly localizers scaling exponentially with the number of monitored services. In yet other examples, some services may share anomaly localizers (e.g., one anomaly localizer may analyze data from multiple services).

Each of the services 102-108 produce monitoring data that may be generated from a monitoring probe. The monitoring probe generates monitoring traffic to or for the servers involved with the services 102-108 and the dependencies 101. The response to the monitoring traffic is analyzed and errors or other metrics are generated as monitoring data. The monitoring or testing by the monitoring probe may occur at intervals (e.g., every few milliseconds) to generate a time series of monitoring data for each of the services. This time series of monitoring data is provided to the corresponding anomaly localizer to analyze the data and localize or identify anomalies in the data. For example, monitoring data for the first service 102 is ingested by the first anomaly localizer 112, and monitoring data for the second service 104 is ingested by the second anomaly localizer 114. The monitoring data includes a time stamp, dimensions relating to the monitoring traffic, and an error metric that is indicative of error or performance impacts. Each dimension may relate to a physical or logical component of the service or server(s) providing the respective service.

The time-series monitoring data may include incredibly large amounts of data for analysis. For instance, dimensions may be included in the monitored data, and each dimension may have a high cardinality. For instance, a cluster dimension may have a cardinality in the thousands, a region dimension may have a cardinality in the tens or hundreds, and other dimensions may have similarly large or larger cardinalities. In such examples, the time series to be analyzed may be in excess of 100,000.

Each of the anomaly localizers 112-118 analyzes the ingested multidimensional time series monitoring data to identify or localize anomalies in the data, such as an error spike. For instance, each of the anomaly localizers 112-118 may output a ranked list of dimension combinations and a corresponding anomaly score. The ranked list is ranked by the anomaly score, where the anomaly score is indicative of an anomaly caused by the combination of dimensions (e.g., a scope), as discussed further below.

The anomaly score may be based on an objective function that may also be used to efficiently search through a search space representative of the time series monitoring data. An example function is as follows:

$$R(x) = p_a(x) \ln \frac{p_a(x)}{p_b(x)}$$

The first term, $p_a(x)$, may be considered the normalized volume of errors after a specified point (change point x) in the time series. The greater the volume of errors are after this change point, the greater R(x) will be. The second term is called the change ratio. This change ratio includes the previously described $p_a(x)$ as well as the term $p_b(x)$. The term $p_b(x)$ may be considered the normalized volume of errors before the changepoint. This ratio measures the normalized change before and after the change point. The more dramatic the increase in error volume after the changepoint, the greater this value and R(x) will be.

The outputs from the anomaly localizers 112-118 (e.g., the ranked lists) are provided to a correlator 120 of the SWAG subsystem 110. The correlator includes algorithms or programs that identify scope or dimension correlations between the outputs of the anomaly localizers 112-118. The correlations may be made based on the topology of the service to ultimately generate cross-service alerts 122 that are provided to at least two of the services that are experiencing the anomaly or likely to experience the anomaly.

As an example of the functionality of the correlator 120, for N services and their associated anomalies in the outputs from the anomaly localizers 112-118, the correlator 120 may iteratively construct larger and larger combinations of services where there exists at least one similar anomalous scope (e.g., combination of dimensions) for each generated service combination. If any service combination contains more services and has the same number of anomalous scopes than the smaller combinations used to generate the current one, the correlator 120 discards the smaller service combinations. Otherwise, the smaller combinations are kept.

After generating a collection of service combinations, cross service alerts 122 are formed. Service combination tuples may consume or include any smaller subset service combinations. This alert consolidation may help reduce the number of alerts that are generated while conserving information. For example, if the service combination (first service 102, second service 104) had three anomalous scopes, but service combination (first service 102, second service 104, and third service 106) had one common anomalous scope, the correlator 120 generates one alert 122 centered around the larger service combination. The anomalous scopes of the service pair (first service 102, second service 104) may still be displayed or provided within the same alert. Before generating these alerts, the correlator 120 may perform a reranking of anomalous scopes based on the cumulative correlation for each grouping of services. This reranking helps ensure that similar anomalous time series across services are presented higher on the list in the generated alerts.

Figure 2:
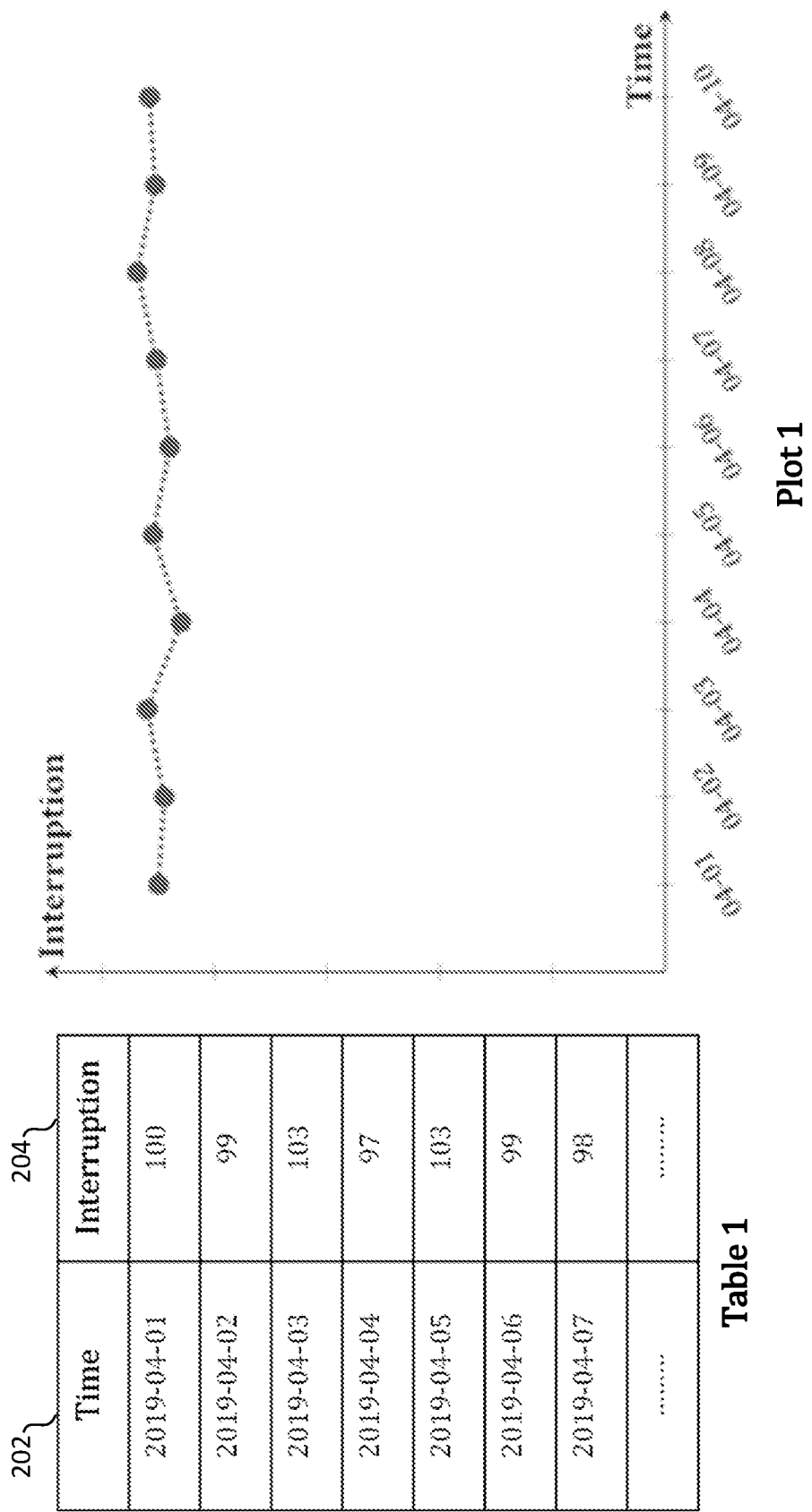
FIG. 2 depicts a table of time series data and a related plot.

FIG. 2 depicts a table (Table 1) of time series monitoring data and a related plot (Plot 1). Table 1 includes a timestamp column 202 that corresponds to the time the monitoring probe collected the data. The error metric 204 in the example monitoring data is the number of interruptions that occurred in the monitoring traffic generated by the monitoring probe. A plot of the error metric 204 (e.g., interruptions) against time is shown in Plot 1. As can be seen from Plot 1, no readily identifiable significant anomaly can be seen.

Figure 3:
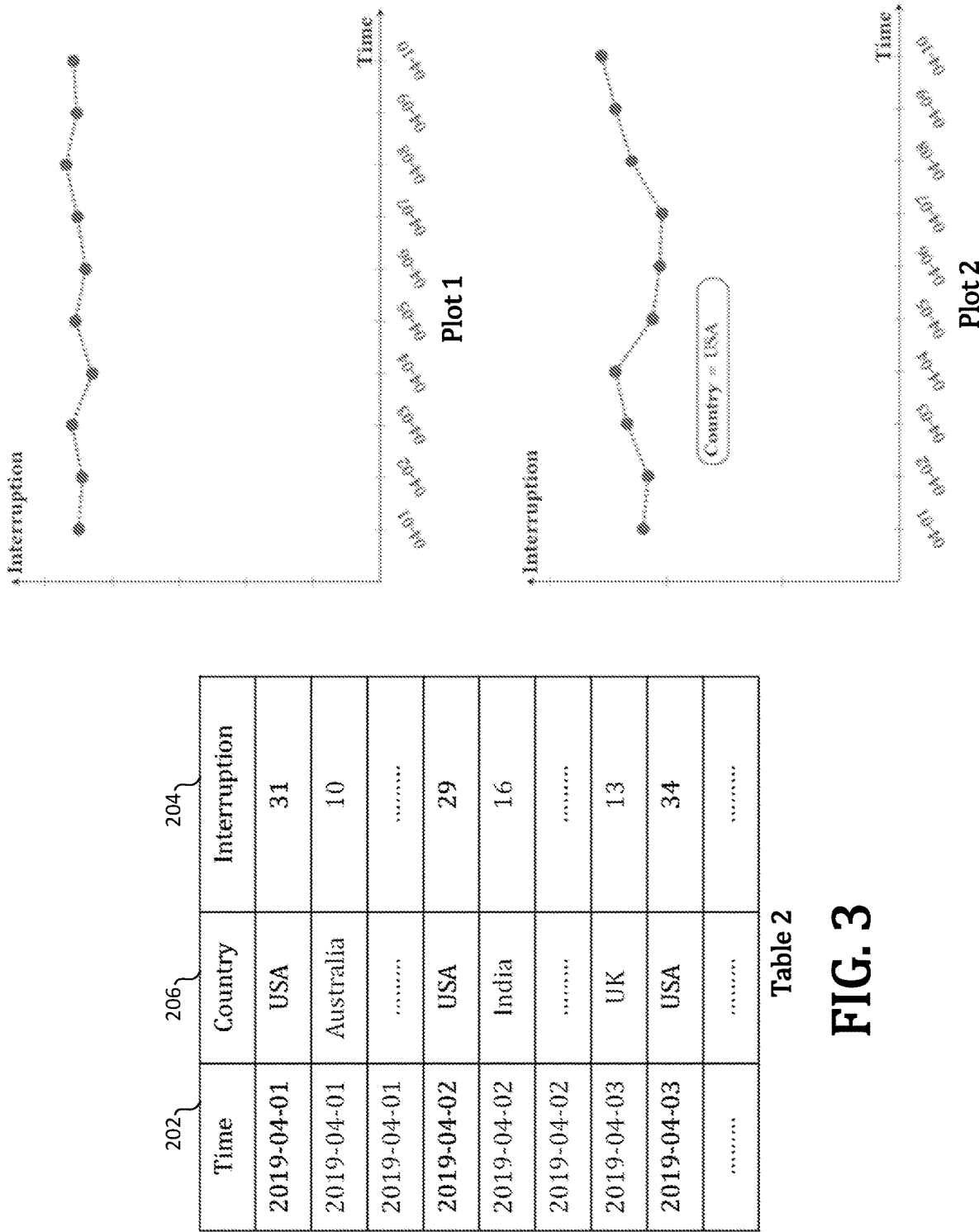
FIG. 3 depicts a table of time series data with an additional dimension and related plots.

FIG. 3 depicts a table (Table 2) of time series monitoring data with an additional dimension and related plots. Table 2 includes the timestamp column 202 and the error metric column 204, but Table 2 also includes the additional dimension of "Country" 206. The country dimension 206 includes a country where the monitoring traffic was handled or processed. The country dimension may have a cardinality equal to the number of possible countries where the monitoring traffic could be handled. For instance, in the sample of monitoring data shown in Table 2, values for the country dimension 206 include at least USA, Australia, India, and UK.

In addition to Plot 1, which is reproduced in FIG. 3, a second plot (Plot 2) is also provided that plots the error metric 204 against time for the country dimension 206 having a value of USA. The scope of the plot or time series may be represented by the tuple of (country, USA). As can be seen from Plot 1 and Plot 2, the error metric 204 changes differently over time when the monitoring data is limited by the country dimension 206 having a value of USA. While an increase in the error metric 204 towards the end of the time represented in Plot 2 can be seen, there is not yet a clear anomaly in the data.

Figure 4:
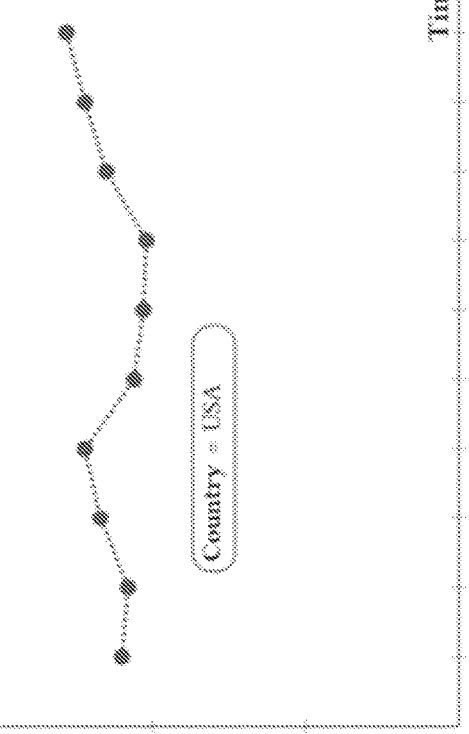
FIG. 4 depicts a table of time series data with an additional dimension and related plots.

FIG. 4 depicts a table (Table 3) of time series monitoring data with an additional dimension and related plots. Table 3 includes the additional dimension of "Datacenter" 208. The datacenter dimension 208 represents the particular datacenter where the monitoring traffic was handled or processed. The datacenter dimension 208 may have a cardinality equal to the number of possible datacenters where the monitoring traffic could be handled. For instance, in the sample of monitoring data shown in Table 3, values for the datacenter dimension 208 include at least DM1, MEL21, DC1, BL1, and SN6.

In addition to Plot 2, which is reproduced in FIG. 4, a third plot (Plot 3) is also provided that plots the error metric 204 against time for the country dimension 206 of USA and the datacenter dimension 208 of DC1. The scope of the plot or time series may be represented by the following combination of tuples (country, USA)|(datacenter, DC1). As can be seen from Plot 2 and Plot 3, the error metric 204 changes differently over time when the monitoring data is further limited by the datacenter dimension 208 having a value of DC1. For instance, a steeper trend of increased interruptions can be seen in Plot 3.

Figure 5B:
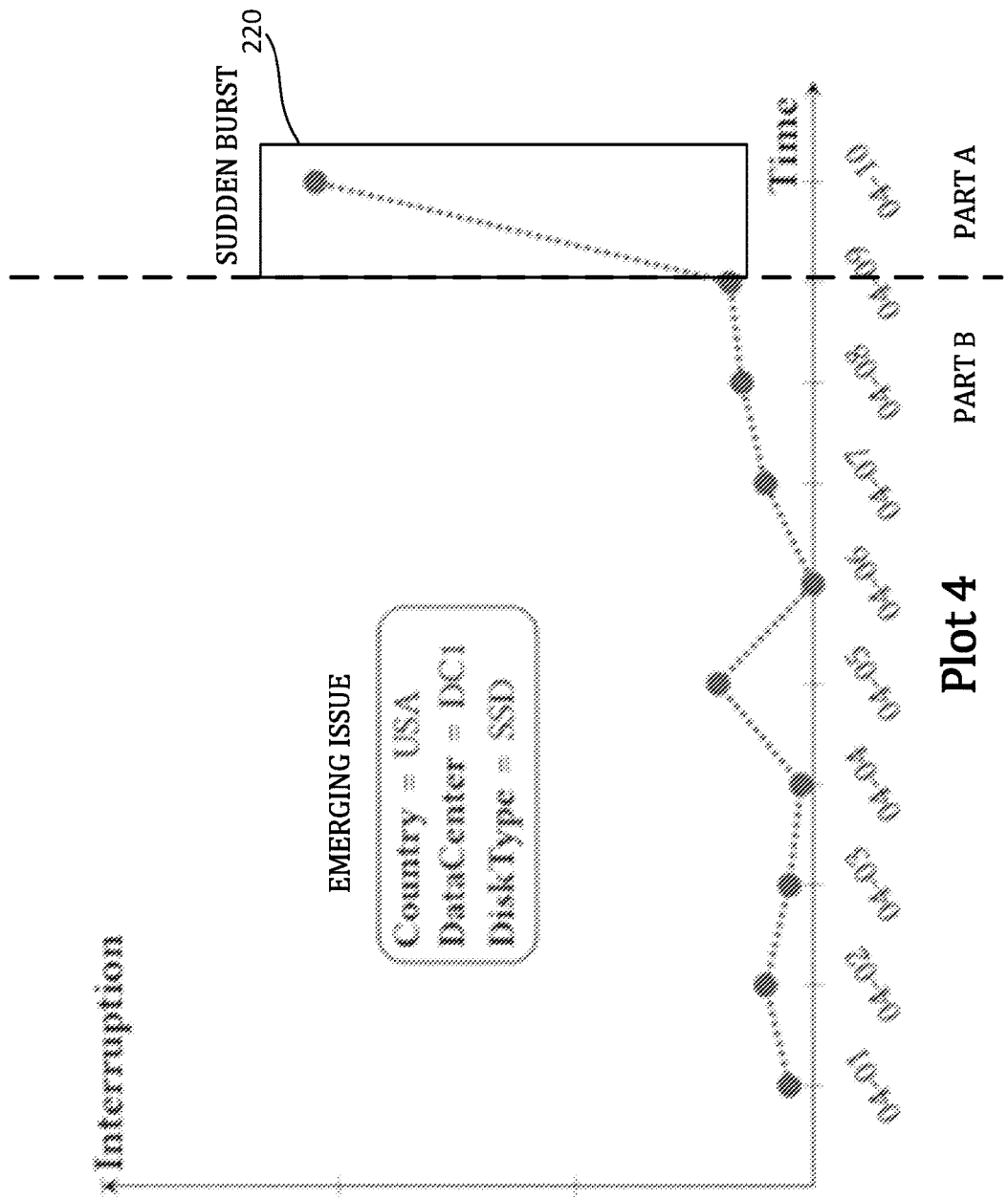
FIG. 5B depicts a plot related to the table of time series data in FIG. 5A.

FIG. 5A depicts a table (Table 4) of time series monitoring data with yet another additional dimension, and FIG. 5B depicts an additional plot (Plot 4). Table 4 includes the additional dimension of "Disk Type" 210. The disk type dimension 210 represents the type of disk that handled or processed the monitoring traffic. The disk type dimension 210 may have a cardinality equal to the number of different types of disks used. For instance, in the sample monitoring data shown Table 4, values for the disk type dimension include at least SSD, HDD, and Hybrid.

Plot 4, shown in FIG. 5B, plots the error metric 204 against time for the country dimension 206 of USA, the datacenter dimension 208 of DC1, and the disk type dimension 210 of SSD. The scope of the plot or time series of Plot 4 may be represented by the following combination of tuples (country, USA)|(datacenter, DC1)|(disk type, SSD). As can be seen in Plot 4, for foregoing scope, a sudden burst of interruptions occurs around the April $9^{th}$ date. For instance, in Part A of Plot 4 (e.g., after April $9^{th}$), a steep increase in the error metric 204 occurs as compared to Part B of Plot 4 (e.g., before April $9^{th}$). The point in time at which this change occurs (e.g., April $9^{th}$) may be referred to as the change point. Such a steep increase corresponds to anomaly that may be localized or root caused to the scope of (country, USA)|(datacenter, DC1)|(disk type, SSD). The objective function discussed above provides a mechanism for identifying such quick changes in the error metric over time. For instance, when the monitoring data is limited by the scope (country, USA)|(datacenter, DC1)|(disk type, SSD), the objective function score for the time series of the error metric is high, indicating an anomaly.

Figure 6:
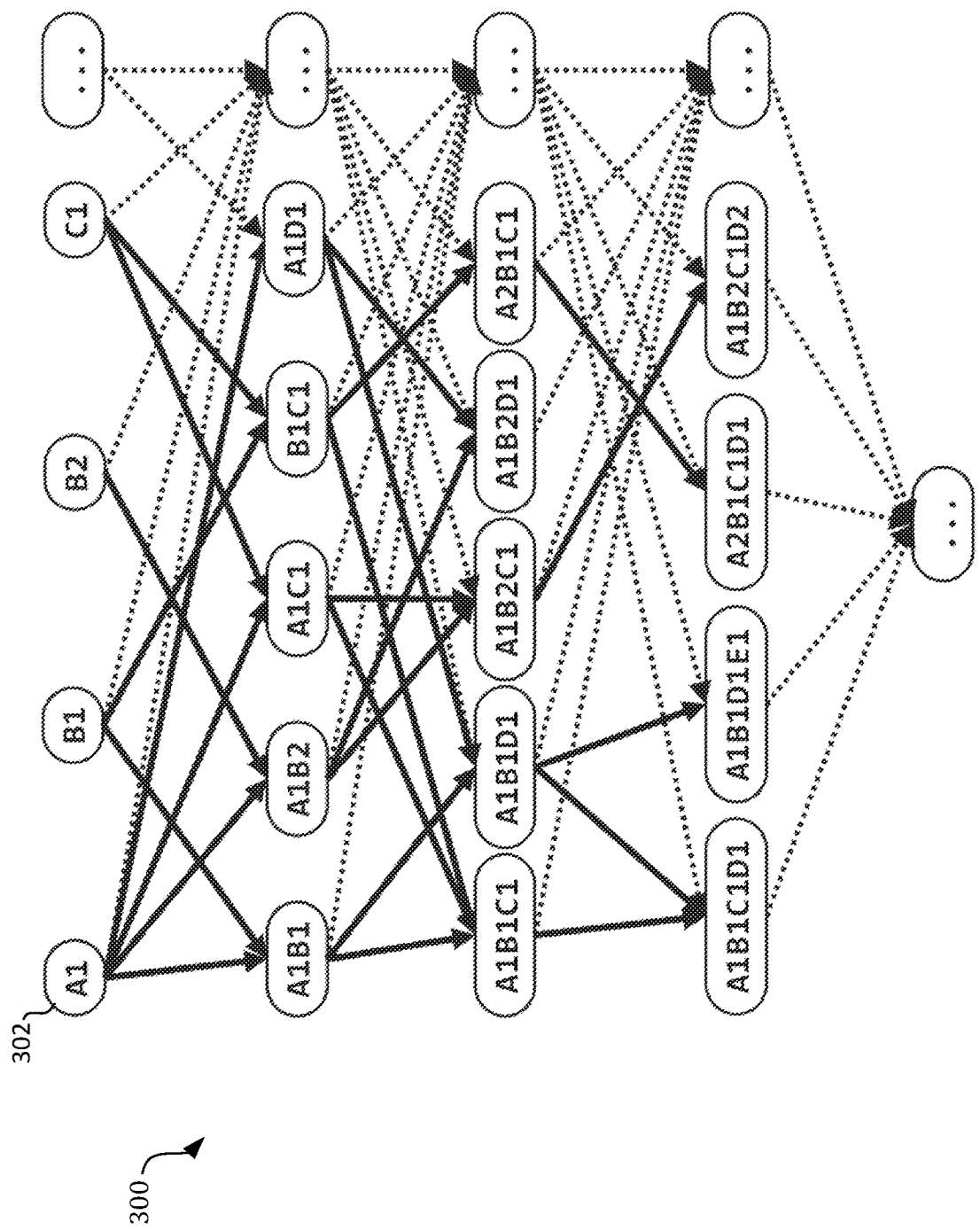
FIG. 6 depicts an example search tree or graph.

FIG. 6 depicts an example search tree or graph 300 that forms a search space for searching different scopes that may be associated with an anomaly of the error metric. While the time-series monitoring data discussed in the examples herein (such as the data in FIGS. 2-5) are relatively smalls samples used for clarity purposes, in implementation, the monitoring data may include hundreds of thousands of data points and possible combinations. Accordingly, searching such data to identify anomalies with the objective function is a difficult task that has the potential to consume significant computing resources.

The search graph 300 includes a plurality of nodes 302 that represent a particular scope, such as a dimension value or combinations of different values for different dimensions. For instance, top level nodes (e.g., A1, B1, B2) represent a scope of a single dimension and corresponding value. The second level nodes (e.g., A1B1, A1B2) include nodes having a scope that is a combination of two dimensions. The third level of nodes (e.g., A1B1C1, A1B1D1) include nodes having a scope that is a combination of three dimensions. Additional levels of nodes also exist within the search space and the levels of nodes are based on the number of dimensions within the monitoring data. As should be understood, the number of scopes or number of nodes may grow significantly with additional dimensions and dimensions with high cardinalities.

Figure 7:
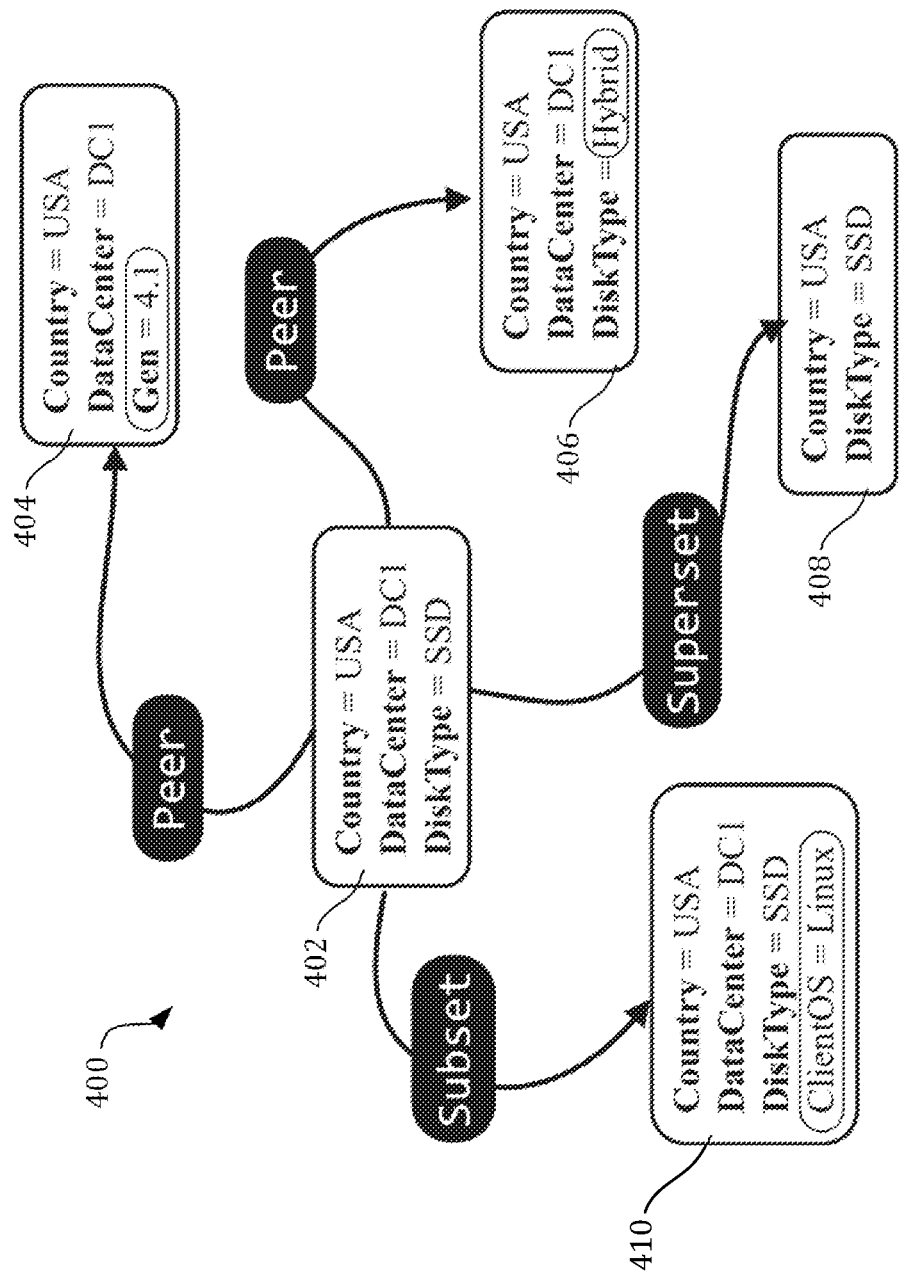
FIG. 7 depicts an example segment of a search tree or graph.

FIG. 7 depicts an example segment of a search tree or graph 400 having nodes filled with actual dimensions and values. For instance, the search graph 400 includes a first node 402 that has a scope of (Country, USA)|(Datacenter, DC1)|(DiskType, SSD). From the perspective of the first node 402, the first node 402 has a first peer node 404 and a second peer node 406. The scopes of the peer nodes 404, 406 similarly have a three-dimension scope. The dimensions, however, are not necessarily the same. For example, the second peer node 406 has the same dimensions as the first node 402 (but different values for the dimensions), and the first peer node 404 has different dimensions. Also from the perspective of the first node 402, the first node has a parent or superset node 408 and a child or subset node 410. The superset node 408 has a scope that is one dimension less than the first node 402 (e.g., a two-dimension scope). The subset node 410 has a scope that is one dimension greater than the first node 402 (e.g., a four-dimension scope).

In performing the search across the search space, the objective function is evaluated for each of the nodes, and a ranked list of nodes (e.g., scopes) is generated based on values for the objective function. For instance, scopes with a higher objective function value are ranked higher than scopes with a lower objective function value.

Due to the large number of scopes that must be evaluated and traversed in performing the search, the search may be resource intensive. For instance, one option to traverse such a search space is to use a greedy search that has to search all subsets before moving to a peer node. Such a search strategy is highly complex, especially in scenarios where the search space includes hundreds of thousands of different combinations of scopes or nodes. Such a greedy search becomes very time-consuming and therefore inefficient. As another search option, a random search may be used, which is less resource intensive. A random search without an informative guide is also ineffective and may produce inaccurate results.

While the greedy search and the random search alone have drawbacks, the presently disclosed technologies utilize aspects of both the greedy search and the random search to leverage the best of both search strategies. The hybrid search mode of the present technology may be referred to as AiDice in some examples. The hybrid search mode uses the greedy search and the random search to accelerate search efficiency while also avoiding local optima or maxima. Additional details regarding the hybrid search are discussed below in greater detail with respect to FIGS. 8A-8D.

Figure 8A:
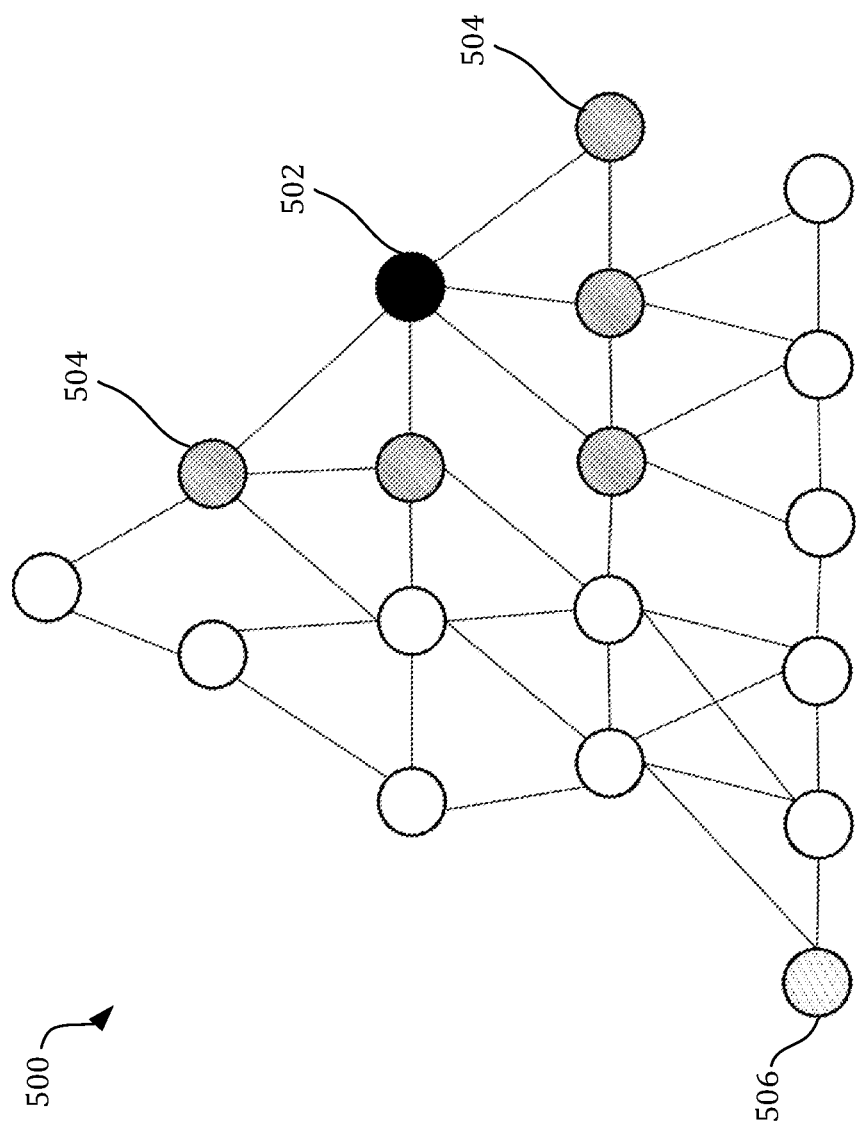
FIG. 8A depicts another example search tree or graph.

FIG. 8A depicts another example search tree or graph 500 to illustrate an example of the hybrid search mode discussed herein. In the example depicted, a current node 502 is being analyzed. The current node 502 includes a number of neighbor nodes 504. The hybrid search mode uses a partial greedy search to traverse the neighbor nodes where some, but not all, of the neighbor nodes are analyzed in the search. By limiting the number of neighbor nodes that are searched, the speed of the search can be substantially improved.

In the modified greedy search of neighbor nodes, the k sample combinations are randomly sampled from the neighbor nodes 504 of the current node 502. The neighbor node 504 with the highest objective function value is then selected as the next current node, and the process repeats. The k number of combinations may be selected based on the following criteria:

$$k \geq \left\lceil \frac{\ln[1 - Pr]}{\ln p} \right\rceil,$$

where p is the percentile among all results and Pr is the corresponding confidence.

In addition to the modified greedy search of neighbor nodes 504, a partial random search may also be completed where one or more random nodes 506 in the search space are selected for evaluation. If the random node 506 has a higher objective function value than the any of the analyzed neighbor nodes 504, that random node 506 becomes the next current node, and the search process repeats. Selection of a random node 506 outside of the neighbor nodes 504 helps ensure that the search process does not stop at a local maximum for the objective function rather than a global maximum for the objective function across the whole search space. In some examples, an already-searched list may be maintained that keeps a list of already searched scopes or nodes such that those already searched scopes are not re-analyzed in the search process (whether as a neighbor node or a randomly selected node).

The results of the search process may include a ranked list of scopes (e.g., nodes) that are ranked based on their respective objective function values (e.g., the highest values are ranked first). In some examples, some of the combinations of dimensions (e.g., scopes) in the results may be characterizing the same incident. Such combinations that characterize the same incident will typically share some of the same contents (e.g., have at least one common dimension value) and will have a time series with a similar change point. These related combinations may be grouped or filtered based on their similarities. For instance, a weighted Jaccard distance or an improved cosine similarity analysis may be performed to measure the similarity of effective combinations. A hierarchical clustering algorithm may also be used to the cluster the scopes in the result of the search.

FIGS. 8B-8D depict tables showing example data for the hybrid search mode discussed herein. Each of the tables show results for the present hybrid search mode (AiDice) as compared to other search modes. The other search modes include iDice, NSGA-2, and MOEA/D. iDice is a pruning-based algorithm for mining attribute data. NSGA-2 is a meta-heuristic algorithm that generates offspring using a specific type of crossover and mutation, and then selects the next generation according to nondominated-sorting and crowding distance comparison. MOEA/D is an evolution algorithm based on decomposition. MOEA/D leverages evolutionary operators to combine good solutions of neighboring problems to allow for potentially beneficial convergence properties. As indicated in the tables and discussed below, the present hybrid search mode outperforms each of the other search modes.

FIG. 8B depicts a table showing precision, recall, and F1 scores for each of the search modes based on sample sets of data. The F1 score is based on the precision and recall values that may be generally representative of the accuracy of the search mode. As can be seen from the table, the present AiDice search mode outperforms each of the other search modes in at least the F1 value for every set of test data.

FIG. 8C depicts a table showing average execution time for each of the search modes. As can be seen from the table, for almost all sets of data, the present hybrid search mode has a shorter execution time than the other search modes. Lastly, FIG. 8D depicts a table showing the number of correctly detected incidents from each search mode. Again, in almost all instances, the present hybrid search mode outperformed the other search modes in identifying more incidents.

The ranked list results from each of the anomaly localizers may be represented as ranked tuples, such as shown in the example table below:

| RANK | SERVICE 1 | SERVICE 2 | SERVICE 3 |
|---|---|---|---|
| 1 | (Scope 1, Obj. Score 1) | (Scope 4, Obj. Score 1) | (Scope 7, Obj. Score 1) |
| 2 | (Scope 2, Obj. Score 2) | (Scope 5, Obj. Score 2) | (Scope 8, Obj. Score 2) |
| 3 | (Scope 3, Obj. Score 3) | (Scope 6, Obj. Score 3) | (Scope 9, Obj. Score 3) |

Accordingly, each result includes the scope of the result (e.g., the combination of dimensions and respective values) as well as the corresponding score for the objective function. The score for the objective function may be referred to as an objective function score or an anomaly score. In some examples, the scopes across the different services may be the same. For instance, the top-ranking scope of the second service (Scope 4) and the top-ranking scope for the third service (Scope 5) may be the same, although due to differences in the services, the objective function score for the two scopes may be different.

The scopes that are provided by each of the anomaly localizers may also be normalized or have their data converted such that each of the scopes share common data schemas for the dimensions and the dimension values. For example, each service may represent its dimensions and the corresponding values slightly differently or in different syntaxes. For instance, one service may represent the country Germany as GER and another service may represent Germany as DEU. These values may be normalized such that they are the same value types across all the results received from the anomaly localizers. Such normalization allows for, or improves, the correlations between the scopes in the results.

Figure 9A:
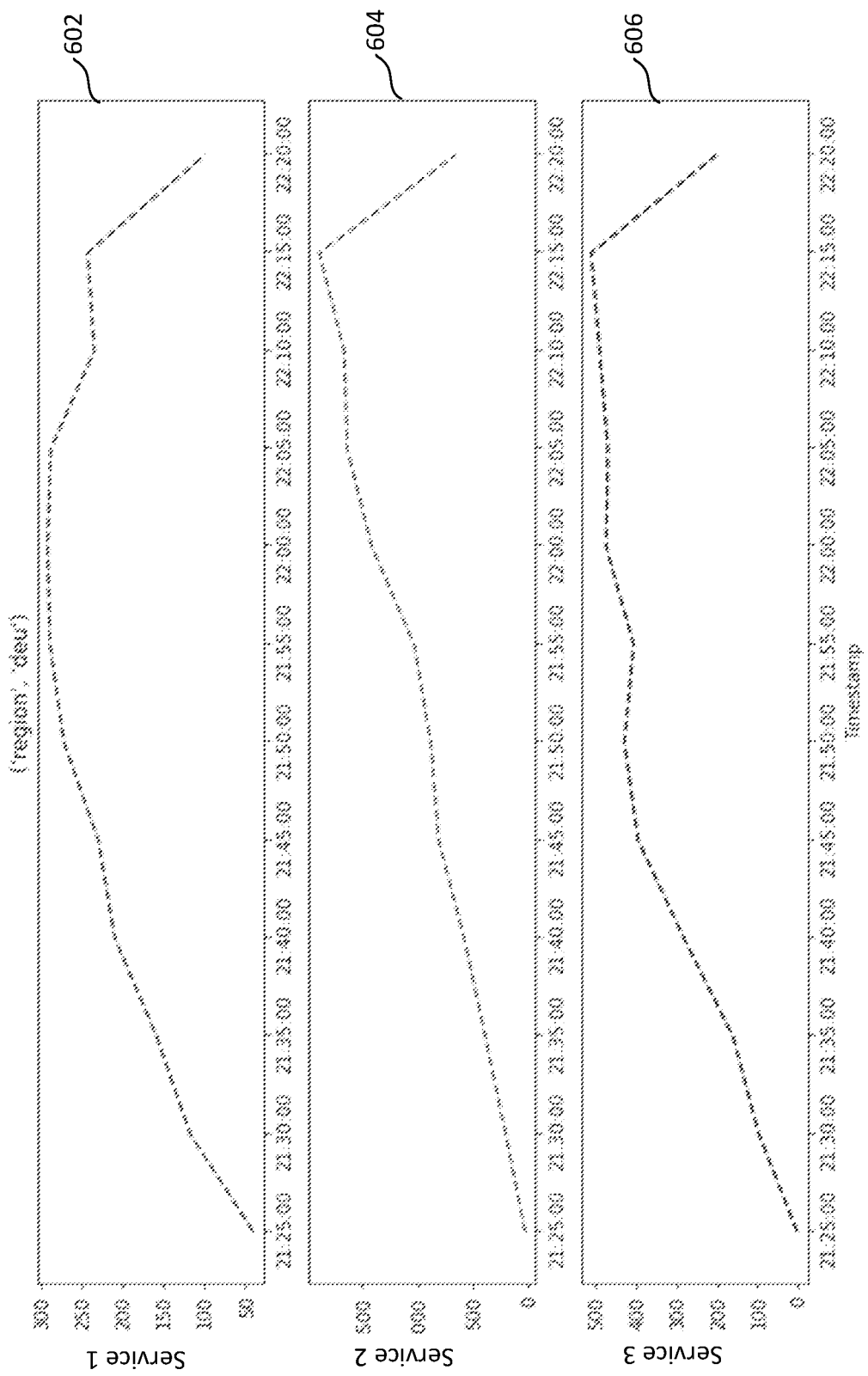
FIG. 9A-9B depicts example plots for errors over time for three different services with anomalous scopes.
Figure 9B:
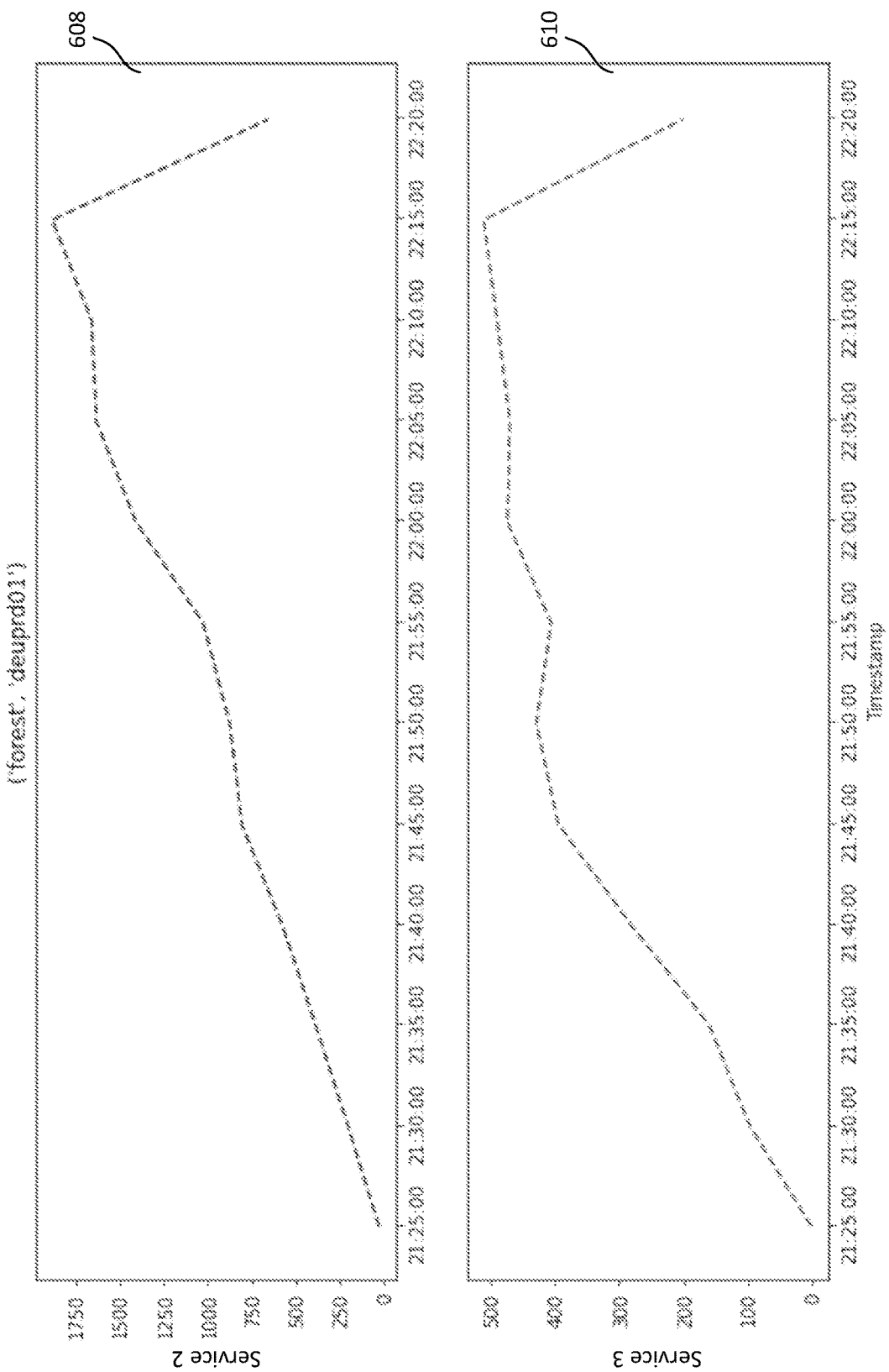

FIG. 9A depicts example plots for errors over time for three different services with anomalous scopes. A first plot 602 is shown for a first service, a second plot 604 is shown for a second service, and a third plot 606 is shown for a third service. The identified anomalous scope is (region, deu), and the anomalous scope was in the top ranked list of anomalous scopes for each of the services. As can be seen from the plots, all three time series share similar characteristics in the same scope—region DEU. FIG. 9B depicts plots 608, 610 for errors over time for Service 2 and Service 3 for a different anomalous scope of (forest, deuprd01) (e.g., a forest in Germany) that was also shared in both the ranked lists of Services 2 and 3. Both times series for this scope also share similar characteristics. In a test on actual data, the deuprd01 account forest was in fact the root cause scope for the underlying issue. That account forest was decommissioned, and the appropriate routing mechanisms were not updated to reflect the decommission, resulting in a resolution failure. Due to this identification, the correlator is able to identify all three services of this error or issue, even where the issue may have only been identified within the monitoring data of two services.

Figure 10A:
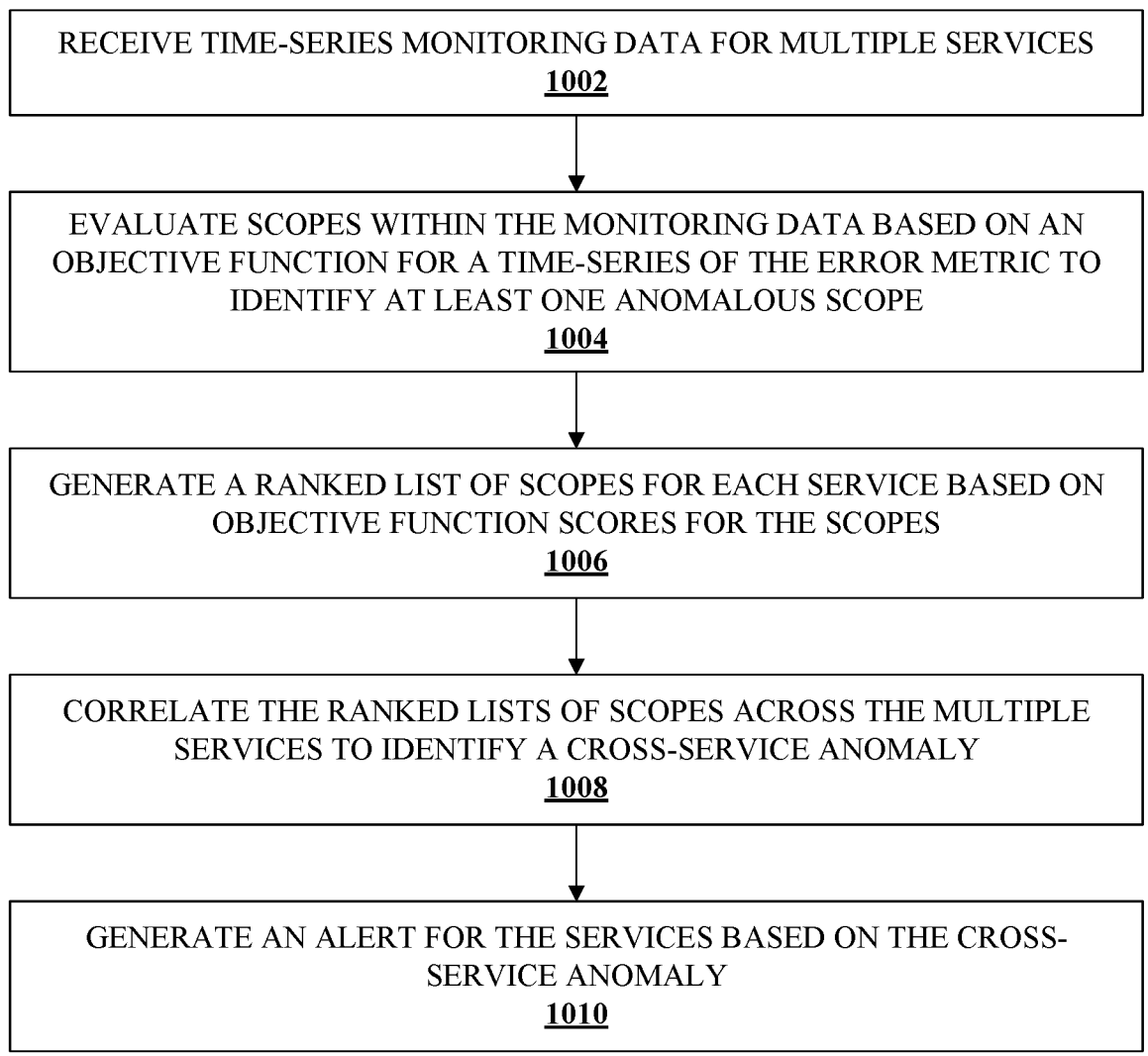
FIG. 10A depicts an example method for detecting systemwide services issues by using anomaly localization.

FIG. 10A depicts an example method 1000 for detecting systemwide services issues by using anomaly localization. The example method 1000 may be performed by the SWAG subsystem that may be executing on one or more computing devices, such as servers, that are in communication with a plurality of services, which may be executing on the same or different servers as the SWAG subsystem.

At operation 1002, time-series monitoring data for multiple services is received for multiple services. The time-series monitoring data includes multiple dimensions, values for those dimensions, and an error metric. For instance, the time time-series monitoring data for each service may be received by a different instance of an anomaly localizer. At operation 1004, for the monitoring data from each service, scopes within the monitoring data are evaluated based on an objective function for a time-series of the error metric to identify at least one anomalous scope. As discussed above, each scope includes at least one dimension and a value for the dimension, and many scopes include combinations of dimensions and their respective value. For instance, objective function scores may be generated for the different scopes in the monitoring data by evaluating the time series error metric for the monitoring data as limited by the respective scope. Evaluating the scopes may be performed by traversing a search space of scopes, as discussed above. An example method for such evaluation is also discussed further below with reference to FIG. 10C.

At operation 1006, a ranked list of scopes is generated for each service based on the objective function scores. For example, scopes having the highest objective function scores may be listed at the top of the list. At operation 1008, the ranked lists of scopes are correlated to identify at least one cross-service anomaly (e.g., an anomaly effecting multiple services). The correlation may be performed by a correlator of a SWAG subsystem.

At operation 1010, based on the identification of the cross-service anomaly, an alert is generated for the multiple services. The alert indicates at least one scope as the potential root cause for the cross-service anomaly. The alert may also include time-series plots of the respective error metrics as limited by the scopes. In some examples, scopes that are ultimately reported to the services in the alerts may also be filtered or limited to those scopes where the error metric is above a certain threshold or meet other criteria. For example, even though a scope may have a high objective function score (indicating a quick change or sudden burst in the error metric), the number of total errors may be negligible. For instance, if the total error count is still less than 10 total errors, the alert may not be generated. In addition, generation of the alert may also include a check to see if the error count has since been reduced. For example, if the error metric according to the scope reached a peak and has trended back down to a baseline, the alert may not be generated or that scope may be omitted. The generated alert may be transmitted to each of the services in different forms, such as through a dashboard or through an electronic message.

Figure 10B:
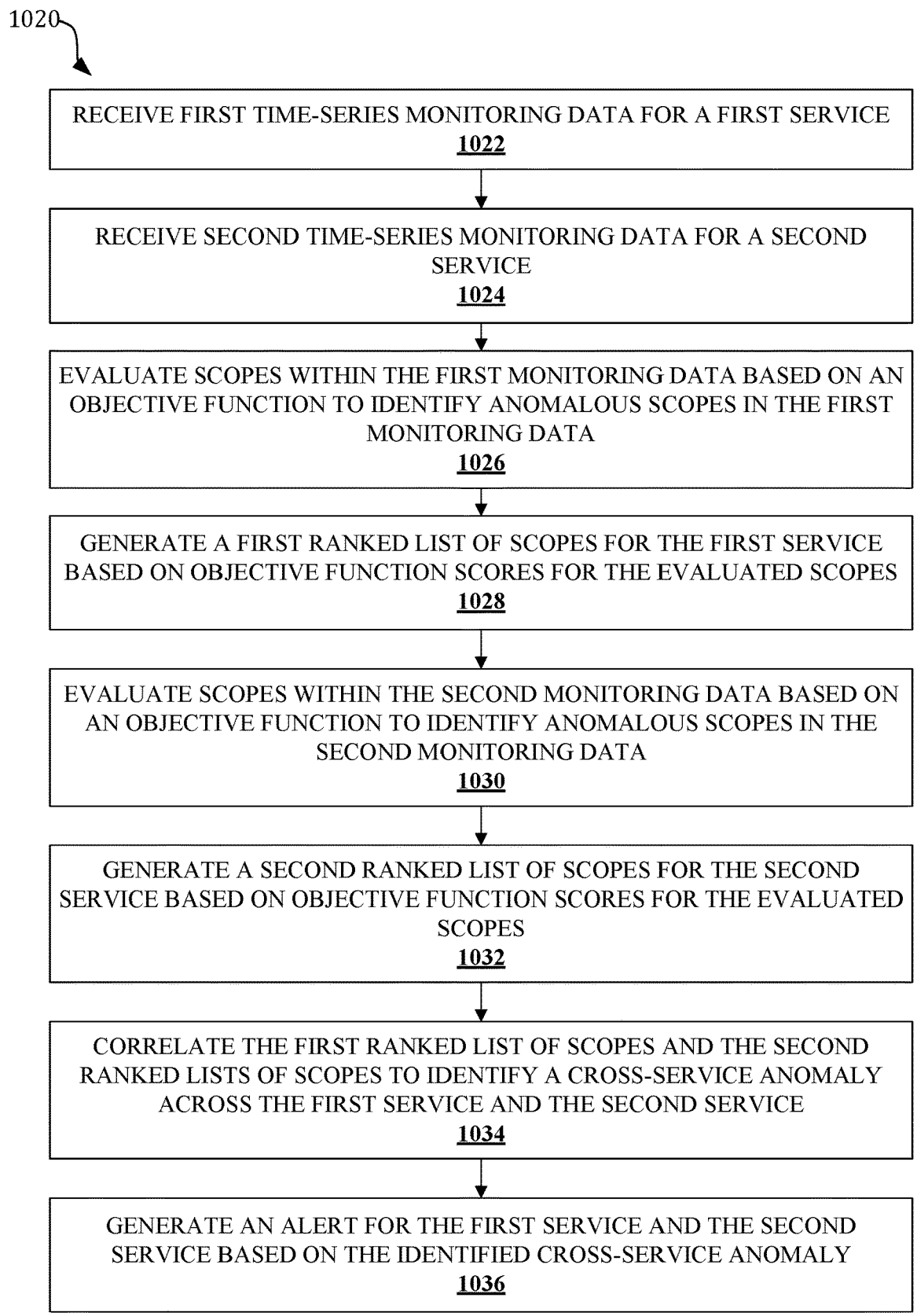
FIG. 10B depicts another example method for detecting systemwide services issues by using anomaly localization.

FIG. 10B depicts another example method 1020 for detecting systemwide services issues by using anomaly localization. At operation 1022, a first time-series monitoring data for a first service is received. The first time-series monitoring data includes multiple dimensions and an error metric. At operation 1024, a second time-series monitoring data for a second service is received. The second time-series monitoring data also includes multiple dimensions and the error metric. The total dimensions of the first monitoring data and the second monitoring data may not be the same, but at least some of the dimensions overlap (e.g., the first monitoring data and the second monitoring data have at least some of the same dimensions).

At operation 1026, scopes within the first monitoring data are evaluated based on an objective function to identify anomalous scopes in the first monitoring data. Each scope includes at least one dimension and a value for the dimension. The scopes may be evaluated by calculating an objective function score for the different scopes. The evaluation of the scopes may be performed by traversing a search space as discussed above and below with reference to FIG. 10C. At operation 1028, based on evaluating the scopes of the first monitoring data, a first ranked list of scopes for the first service is generated based on objective function scores for the evaluated scopes.

At operation 1030, scopes within the second monitoring data are evaluated based on an objective function to identify anomalous scopes in the second monitoring data. Each scope within the second monitoring data includes at least one dimension and a value for the dimension. At operation 1032, based on evaluating the scopes of the second monitoring data, a second ranked list of scopes for the second service is generated based on objective function scores for the evaluated scopes.

At operation 1034, the first ranked list of scopes and the second ranked lists of scopes are correlated to identify a cross-service anomaly across the first service and the second service. At operation 1036, an alert for the first service and the second service is generated based on the identified cross-service anomaly. The alert indicates at least one scope as a potential root cause for the cross-service anomaly. In some examples, the alert may also be generated for or transmitted to a third service that relies on the same dependencies as the first service and the second service.

Figure 10C:
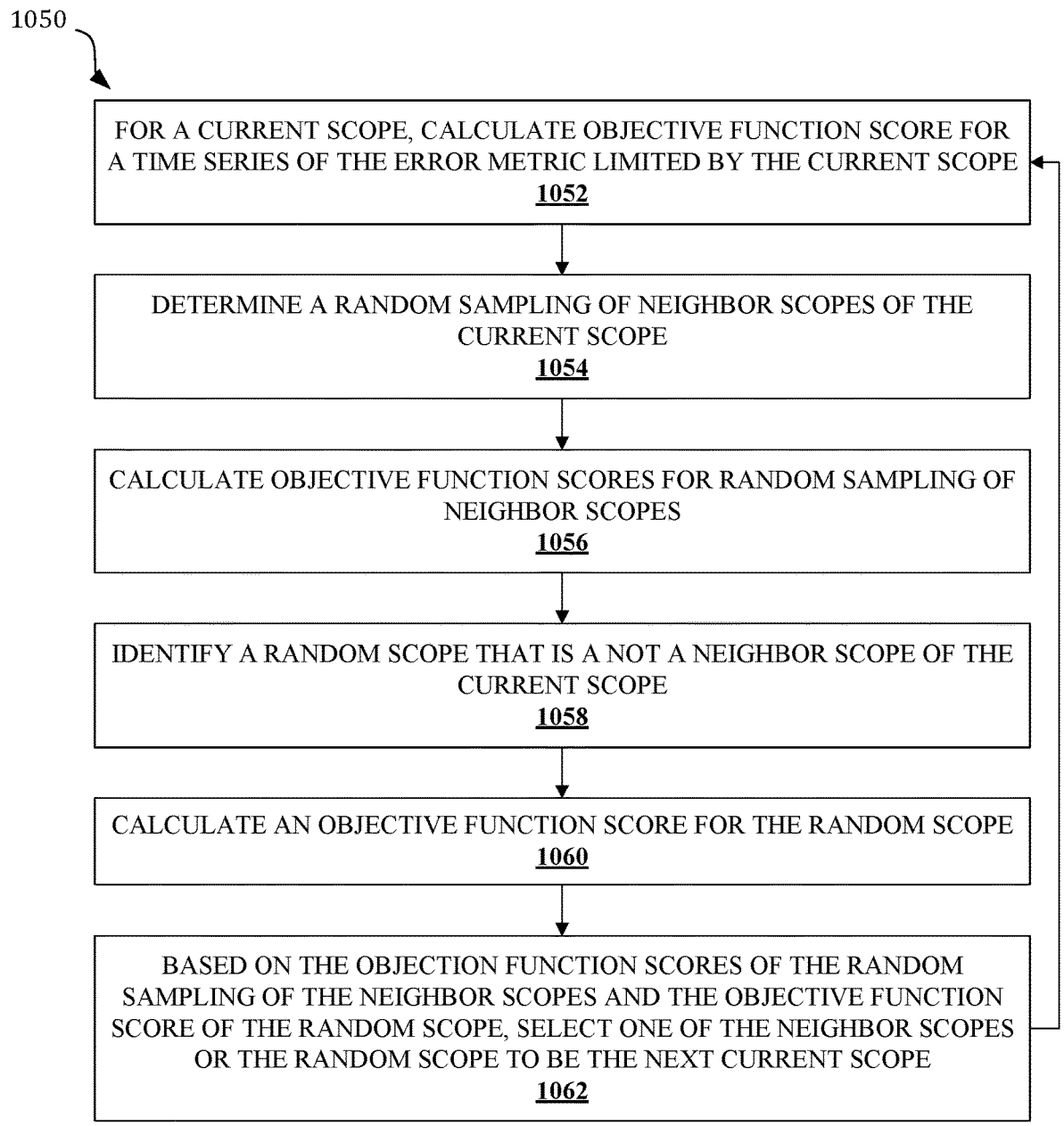
FIG. 10C depicts an example method for searching a search space of scopes for time-series monitoring data.

FIG. 10C depicts an example method 1050 for searching a search space of scopes (e.g., nodes of the search tree or graph) for time-series monitoring data. For example, method 1050 may be used to evaluate the scopes of the monitoring data discussed above in FIGS. 10A-10B.

At operation 1052, for a starting or current scope, an objective function score (e.g., an anomaly score) is calculated for a time series of the error metric limited by the current scope. For instance, the objective function may represent a change in the error metric before and after a point in time. A larger objective function score indicates a larger, or more abrupt, change (such as due to a sudden burst).

At operation 1054, a random sampling of neighbor scopes of the current scope is determined. The neighbor scopes include at least a peer scope, a subset scope, or a superset scope to the current scope. The random sampling may be k number of scopes as discussed above. At operation 1056, objective function scores for the random sampling of neighbor scopes are calculated.

At operation 1058, a random scope in the search space is identified. The random scope is not one of the neighbor scopes of the current scope. At operation 1060, an objective function score is calculated for the random scope. In some examples, more than one random scope may be identified and evaluated at operations 1058-1060.

At operation 1062, one of the neighbor scopes or the random scope is selected to be the next current scope. The next current scope is selected based on the objective function scores of the random sampling of the neighbor scopes and the objective function score of the random scope. The scope that has the highest objective function score is then selected to be the next current scope and the method 1050 repeats with the next current scope. The method continues to repeat until none of the neighbor scopes or the random scope have an objective function score greater than the current scope.

Figure 11:
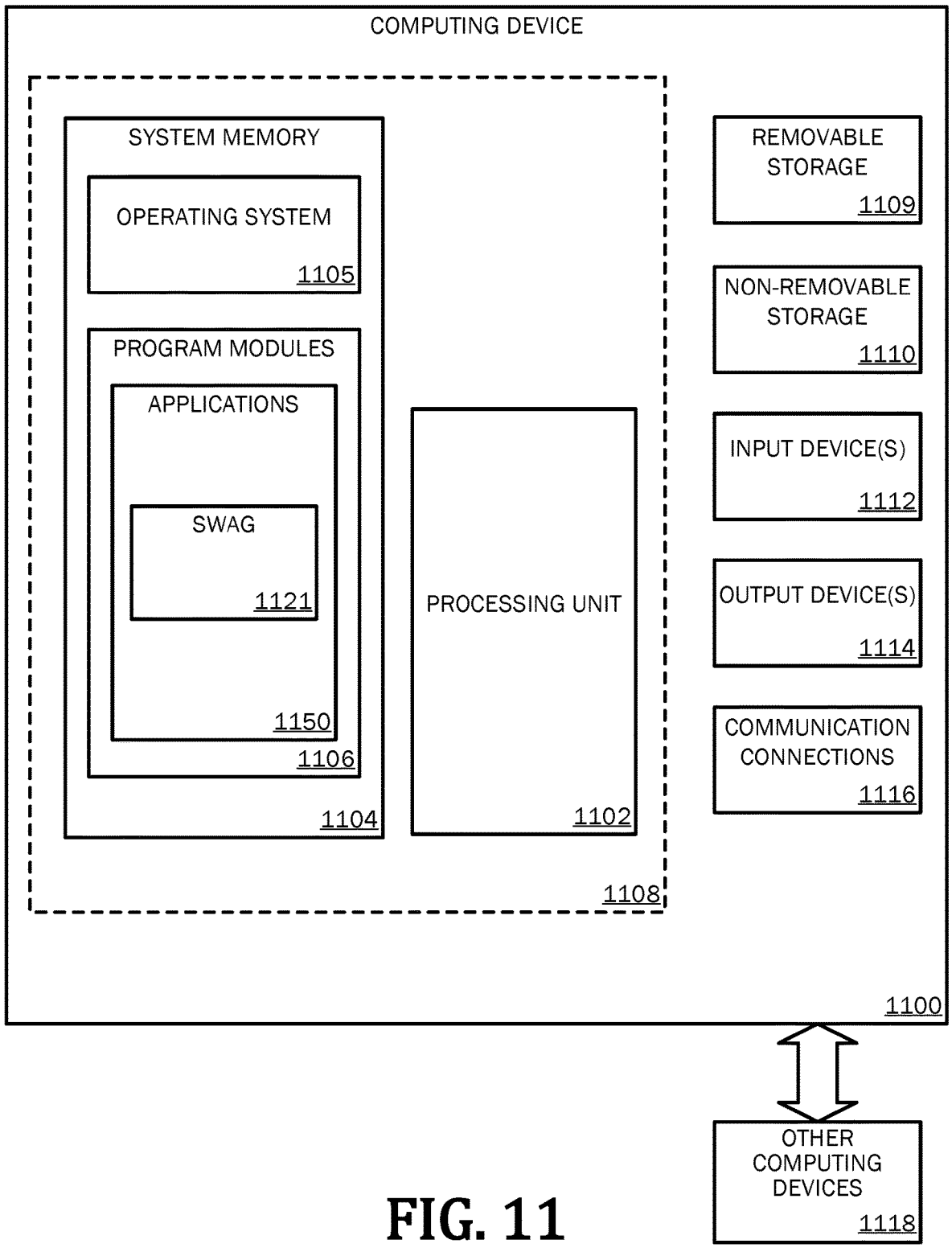
FIG. 11 is a block diagram illustrating example physical components of a computing device with which aspects of the technology may be practiced.

FIGS. 11-12 and the associated descriptions provide a discussion of a variety of operating environments in which examples of the invention may be practiced. However, the devices and systems illustrated and discussed with respect to FIGS. 11-12 are for purposes of example and illustration and are not limiting of a vast number of computing device configurations that may be utilized for practicing aspects of the invention, described herein.

FIG. 11 is a block diagram illustrating physical components (i.e., hardware) of a computing device 1100 with which examples of the present disclosure may be practiced. The computing device components described below may be suitable for a client device running the web browser discussed above. In a basic configuration, the computing device 1100 may include at least one processing unit 1102 and a system memory 1104. The processing unit(s) (e.g., processors) may be referred to as a processing system. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1150 such as a SWAG subsystem or application(s) 1121 (e.g., anomaly localizers and correlator).

The operating system 1105, for example, may be suitable for controlling the operation of the computing device 1100. Furthermore, aspects of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the operations of the methods illustrated in FIGS. 7-10. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 1100 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
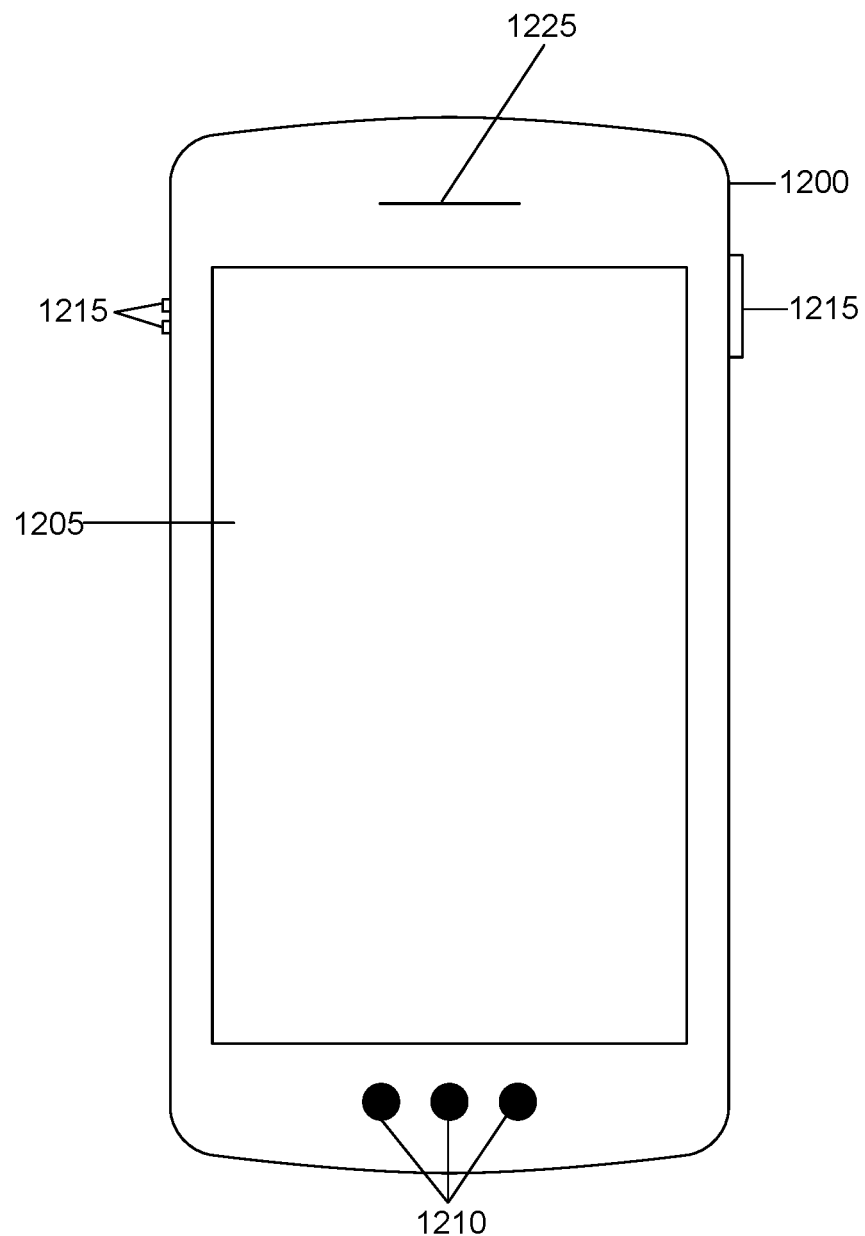
FIGS. 12A and 12B are simplified block diagrams of a mobile computing device with which aspects of the present technology may be practiced.
Figure 12B:
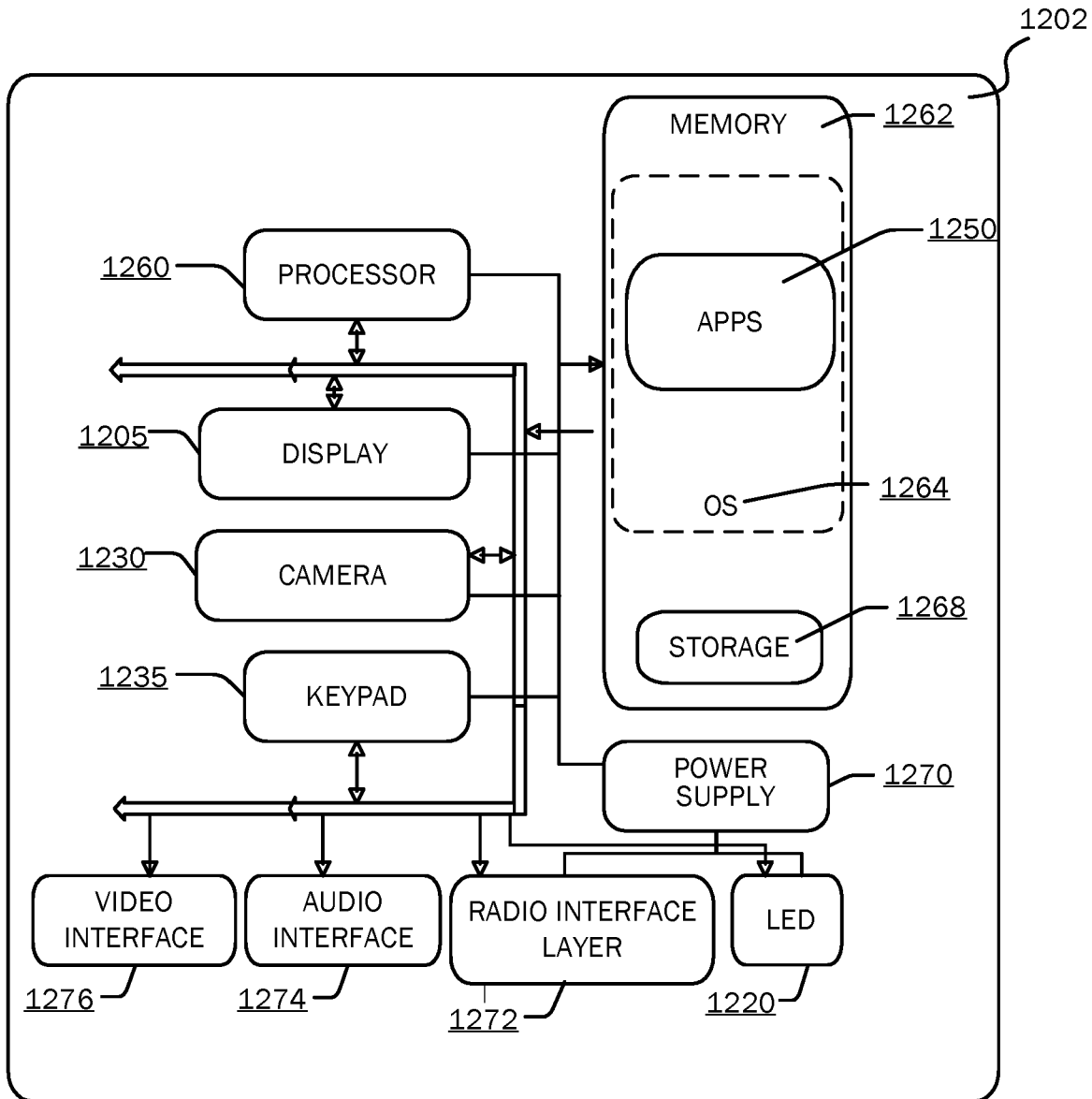

FIGS. 12A and 12B illustrate a mobile computing device 1200, for example, a mobile telephone, a smart phone, a tablet personal computer, a laptop computer, and the like, with which aspects of the invention may be practiced. With reference to FIG. 12A, an example of a mobile computing device 1200 for implementing at least some aspects of the present technology is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative examples, mobile computing device 1200 may incorporate more or less input elements.

For example, the display 1205 may not be a touch screen in some examples. In alternative examples, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 can incorporate a system (i.e., an architecture) 1202 to implement some examples. In one example, the system 1202 is implemented as a "smart phone" capable of running one or more applications (e.g., videoconference or virtual meeting application, browser, e-mail, calendaring, contact managers, messaging clients, games, and media clients/players). In some examples, the system 1202 is integrated as a computing device, such as an integrated personal digital assistant (PDA) and wireless phone.

One or more application programs 1250 may be loaded into the memory 1262 and run on or in association with the operating system 1264. Examples of the application programs include videoconference or virtual meeting programs, phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at a remote device or server. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

The visual indicator 1220 may be used to provide visual notifications and/or an audio interface 1274 may be used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

In an aspect, the technology relates to a processor and memory storing instructions that, when executed by the processor, cause the system to perform operations. The operations include receiving time-series monitoring data for multiple services, the time-series monitoring data including multiple dimensions and an error metric; for the monitoring data from each service, evaluating scopes within the monitoring data based on an objective function for a time-series of the error metric to identify at least one anomalous scope, each scope comprising at least one dimension and a value for the dimension; based on evaluating the scopes, generating a ranked list of scopes for each service based on objective function scores for the scopes; correlating the ranked lists of scopes across the multiple services to identify a cross-service anomaly; and generating an alert for the services based on the cross-service anomaly, the alert indicating at least one scope as a potential root cause for the cross-service anomaly.

In an example, at least one of the evaluated scopes includes a combination of at least two dimensions. In another example, evaluating the scopes includes for a current scope, calculating an objective function score for a time series of the error metric limited by the current scope; determining a random sampling of neighbor scopes of the current scope, wherein the neighbor scopes include at least a peer scope, a subset scope, or a superset scope; and calculating objective function scores for random sampling of neighbor scopes. In a further example, evaluating the scopes further includes identifying a random scope that is a not a neighbor scope of the current scope; calculating an objective function score for the random scope; and based on the objective function scores of the random sampling of the neighbor scopes and the objective function score of the random scope, selecting one of the neighbor scopes or the random scope to be a next current scope. In still another example, the objective function represents a change in the error metric before and after a point in time. In yet another example, the services include at least one of an email service, a messaging service, or a document storage service. In still yet another example, the multiple services rely on at least one common dependency.

In another example, the technology relates to a computer-implemented method for localizing anomalies across multiple services, the method including receiving first time-series monitoring data for a first service, the first time-series monitoring data including multiple dimensions and an error metric; receiving second time-series monitoring data for a second service, the second time-series monitoring data including the multiple dimensions and the error metric; evaluating scopes within the first monitoring data based on an objective function to identify anomalous scopes in the first monitoring data, each scope comprising at least one dimension and a value for the dimension; based on evaluating the scopes of the first monitoring data, generating a first ranked list of scopes for the first service based on objective function scores for the evaluated scopes; evaluating scopes within the second monitoring data based on an objective function to identify anomalous scopes in the second monitoring data, each scope comprising at least one dimension and a value for the dimension; based on evaluating the scopes of the second monitoring data, generating a second ranked list of scopes for the second service based on objective function scores for the evaluated scopes; correlating the first ranked list of scopes and the second ranked lists of scopes to identify a cross-service anomaly across the first service and the second service; and generating an alert for the first service and the second service based on the identified cross-service anomaly, the alert indicating at least one scope as a potential root cause for the cross-service anomaly.

In an example, the first service and the second service include at least one of an email service, a messaging service, or a document storage service; and the first service and the second service rely on at least one common dependency including at least one of authentication, networking, or storage. In another example, evaluating the scopes within the first monitoring data includes, for a current scope, calculating an objective function score for a time series of the error metric limited by the current scope; determining a random sampling of neighbor scopes of the current scope, wherein the neighbor scopes include at least a peer scope, subset scope, or a superset scope; and calculating objective function scores for random sampling of neighbor scopes. In a further example, evaluating the scopes within the first monitoring data further includes identifying a random scope that is a not a neighbor scope of the current scope; calculating an objective function score for the random scope; and based on the objective function scores of the random sampling of the neighbor scopes and the objective function score of the random scope, selecting one of the neighbor scopes or the random scope to be a next current scope.

In another example, the objective function represents a change in the error metric before and after a point in time. In still another example, the first service is an email service, a messaging service, or a document storage service, and the second service is an email service, a messaging service, or a document storage service, the second service being different from the first service. In yet another example, the first service and the second service rely on a common dependency. In a further example, the alert is generated for a third service that also relies on the common dependency.

In another aspect, the technology relates to a computer-implemented method for localizing anomalies across multiple services. The method includes receiving time-series monitoring data for multiple services, the time-series monitoring data including multiple dimensions and an error metric; for the monitoring data from each service, evaluating scopes within the monitoring data based on an objective function for a time-series of the error metric to identify at least one anomalous scope, each scope comprising at least one dimension and a value for the dimension; based on evaluating the scopes, generating a ranked list of scopes for each service based on objective function scores for the scopes; correlating the ranked lists of scopes across the multiple services to identify a cross-service anomaly; and generating an alert for the services based on the cross-service anomaly, the alert indicating at least one scope as a potential root cause for the cross-service anomaly.

In an example, evaluating the scopes includes for a current scope, calculating an objective function score for a time series of the error metric limited by the current scope; determining a random sampling of neighbor scopes of the current scope, wherein the neighbor scopes include at least a peer scope, a subset scope, or a superset scope; and calculating objective function scores for random sampling of neighbor scopes. In a further example, evaluating the scopes within the first monitoring data further includes identifying a random scope that is a not a neighbor scope of the current scope; calculating an objective function score for the random scope; and based on the objective function scores of the random sampling of the neighbor scopes and the objective function score of the random scope, selecting one of the neighbor scopes or the random scope to be a next current scope. In yet another example, the objective function represents a change in the error metric before and after a point in time. In still another example, the services include at least one of an email service, a messaging service, or a document storage service.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computing system comprising:
   a processor; and
   memory storing instructions that, when executed by the processor, cause the system to perform operations comprising:
   receiving time-series monitoring data for multiple services, the time-series monitoring data including multiple dimensions and an error metric;
   for the time-series monitoring data from each service, evaluating scopes within the time-series monitoring data based on an objective function for a time-series of the error metric to identify at least one anomalous scope, each scope comprising at least one dimension and a value for the dimension;
   based on evaluating the scopes, generating a ranked list of scopes for each service based on objective function scores for the scopes;
   correlating the ranked lists of scopes across the multiple services to identify a cross-service anomaly; and
   generating an alert for the multiple services based on the cross-service anomaly, the alert indicating at least one scope as a potential root cause for the cross-service anomaly.

2. The system of claim 1, wherein at least one of the evaluated scopes includes a combination of at least two dimensions.

3. The system of claim 1, wherein evaluating the scopes comprises:
   for a current scope, calculating an objective function score for a time series of the error metric limited by the current scope;
   determining a random sampling of neighbor scopes of the current scope, wherein the neighbor scopes include at least a peer scope, a subset scope, or a superset scope; and
   calculating objective function scores for random sampling of neighbor scopes.

4. The system of claim 3, wherein evaluating the scopes further comprises:
   identifying a random scope that is a not a neighbor scope of the current scope;
   calculating an objective function score for the random scope; and
   based on the objective function scores of the random sampling of the neighbor scopes and the objective function score of the random scope, selecting one of the neighbor scopes or the random scope to be a next current scope.

5. The system of claim 1, wherein the objective function represents a change in the error metric before and after a point in time.

6. The system of claim 1, wherein the multiple services include at least one of an email service, a messaging service, or a document storage service.

7. The system of claim 1, wherein the multiple services rely on at least one common dependency.

8. A computer-implemented method for localizing anomalies across multiple services, the method comprising:
   receiving first time-series monitoring data for a first service, the first time-series monitoring data including multiple dimensions and an error metric;
   receiving second time-series monitoring data for a second service, the second time-series monitoring data including the multiple dimensions and the error metric;
   evaluating scopes within the first time-series monitoring data based on an objective function to identify anomalous scopes in the first time-series monitoring data, each scope comprising at least one dimension and a value for the dimension;
   based on evaluating the scopes of the first time-series monitoring data, generating a first ranked list of scopes for the first service based on objective function scores for the evaluated scopes;
   evaluating scopes within the second time-series monitoring data based on an objective function to identify anomalous scopes in the second time-series monitoring data, each scope comprising at least one dimension and a value for the dimension;
   based on evaluating the scopes of the second time-series monitoring data, generating a second ranked list of scopes for the second service based on objective function scores for the evaluated scopes;
   correlating the first ranked list of scopes and the second ranked lists of scopes to identify a cross-service anomaly across the first service and the second service; and
   generating an alert for the first service and the second service based on the identified cross-service anomaly, the alert indicating at least one scope as a potential root cause for the cross-service anomaly.

9. The method of claim 8, wherein:
   the first service and the second service include at least one of an email service, a messaging service, or a document storage service; and
   the first service and the second service rely on at least one common dependency including at least one of authentication, networking, or storage.

10. The method of claim 8, wherein evaluating the scopes within the first time-series monitoring data comprises:
   for a current scope, calculating an objective function score for a time series of the error metric limited by the current scope;
   determining a random sampling of neighbor scopes of the current scope, wherein the neighbor scopes include at least a peer scope, a subset scope, or a superset scope; and
   calculating objective function scores for random sampling of neighbor scopes.

11. The method of claim 10, wherein evaluating the scopes within the first time-series monitoring data further comprises:
   identifying a random scope that is a not a neighbor scope of the current scope;
   calculating an objective function score for the random scope; and
   based on the objective function scores of the random sampling of the neighbor scopes and the objective function score of the random scope, selecting one of the neighbor scopes or the random scope to be a next current scope.

12. The method of claim 8, wherein the objective function represents a change in the error metric before and after a point in time.

13. The method of claim 8, wherein the first service is an email service, a messaging service, or a document storage service, and the second service is an email service, a messaging service, or a document storage service, the second service being different from the first service.

14. The method of claim 8, wherein the first service and the second service rely on a common dependency.

15. The method of claim 14, wherein the alert is generated for a third service that also relies on the common dependency.

16. A computer-implemented method for localizing anomalies across multiple services, the method comprising:
   receiving time-series monitoring data for multiple services, the time-series monitoring data including multiple dimensions and an error metric;
   for the time-series monitoring data from each service, evaluating scopes within the time-series monitoring data based on an objective function for a time-series of the error metric to identify at least one anomalous scope, each scope comprising at least one dimension and a value for the dimension;
   based on evaluating the scopes, generating a ranked list of scopes for each service based on objective function scores for the scopes;
   correlating the ranked lists of scopes across the multiple services to identify a cross-service anomaly; and
   generating an alert for the multiple services based on the cross-service anomaly, the alert indicating at least one scope as a potential root cause for the cross-service anomaly.

17. The method of claim 16, wherein evaluating the scopes comprises:
   for a current scope, calculating an objective function score for a time series of the error metric limited by the current scope;
   determining a random sampling of neighbor scopes of the current scope, wherein the neighbor scopes include at least a peer scope, a subset scope, or a superset scope; and
   calculating objective function scores for random sampling of neighbor scopes.

18. The method of claim 17, wherein evaluating the scopes within the time-series monitoring data further comprises:
   identifying a random scope that is a not a neighbor scope of the current scope;
   calculating an objective function score for the random scope; and
   based on the objective function scores of the random sampling of the neighbor scopes and the objective function score of the random scope, selecting one of the neighbor scopes or the random scope to be a next current scope.

19. The method of claim 16, wherein the objective function represents a change in the error metric before and after a point in time.

20. The method of claim 16, wherein the multiple services include at least one of an email service, a messaging service, or a document storage service.

\* \* \* \* \*